United States Patent
Orsello

(10) Patent No.: US 9,029,747 B2
(45) Date of Patent: May 12, 2015

(54) METHOD AND SYSTEM FOR CONCENTRATION OF SOLAR THERMAL ENERGY

(76) Inventor: Robert Orsello, Scottsdale, AZ (US)

( * ) Notice: Subject to any disclaimer, the term of this patent is extended or adjusted under 35 U.S.C. 154(b) by 538 days.

(21) Appl. No.: 13/498,442

(22) PCT Filed: Oct. 7, 2010

(86) PCT No.: PCT/US2010/051815
§ 371 (c)(1),
(2), (4) Date: Mar. 27, 2012

(87) PCT Pub. No.: WO2011/044356
PCT Pub. Date: Apr. 14, 2011

(65) Prior Publication Data
US 2012/0187276 A1   Jul. 26, 2012

Related U.S. Application Data

(60) Provisional application No. 61/249,280, filed on Oct. 7, 2009.

(51) Int. Cl.
| | |
|---|---|
| *F24J 2/00* | (2014.01) |
| *F24J 2/07* | (2006.01) |
| *F24J 2/16* | (2006.01) |
| *F24J 2/52* | (2006.01) |
| *F24J 2/54* | (2006.01) |
| *F24J 2/10* | (2006.01) |

(52) U.S. Cl.
CPC ..... *F24J 2/07* (2013.01); *F24J 2/16* (2013.01); *F24J 2/5264* (2013.01); *F24J 2/542* (2013.01); *F24J 2002/1076* (2013.01); *F24J 2002/5479* (2013.01); *Y02E 10/41* (2013.01); *Y02E 10/47* (2013.01)

(58) Field of Classification Search
CPC .............. F24J 2/07; F24J 2/10; F24J 2/16; F24J 2/542; F24J 2/5264; F24J 2/5403; F24J 2002/1076; F24J 2002/5479; F24J 2002/5475
USPC ............ 250/203.4, 203.3, 203.1; 353/3; 126/571, 572, 573, 574, 575, 576, 577, 126/578, 600, 601, 605, 607, 684, 643, 627, 126/680, 688, 696; 238/151, 152, 171, 172, 238/262
See application file for complete search history.

(56) References Cited

U.S. PATENT DOCUMENTS 260,657 A * 7/1882 Calver .......................... 126/607
608,755 A * 8/1898 Cottle .......................... 136/206

(Continued)

*Primary Examiner* — John Lee
(74) *Attorney, Agent, or Firm* — Angela M. Brunetti

(57) ABSTRACT

A solar thermal concentration system has a receiver, a rail system having a plurality of concentric rails circularly disposed about the receiver, a plurality of movable carts connected adjacent one another and spanning two concentric rails of the rail system, motor means on a movable cart dispersed in the plurality of movable carts, a heliostat mirror on a plurality of movable carts, and a controller for tracking the Sun and controlling a position of the array with respect to the receiver and the Sun. The plurality of movable carts over all of the concentric rails define an array of heliostat mirrors having a predetermined arc dimension configured to maximize mirror area based on cosine efficiency principle. Each heliostat mirror and each movable cart having motor means is in communication with the controller for moving the carts and heliostat mirrors with respect to the receiver and the Sun.

20 Claims, 7 Drawing Sheets

(56) References Cited

U.S. PATENT DOCUMENTS

| | | | | |
|---|---|---|---|---|
| 2,381,446 A * | 8/1945 | Harris | | 405/4 |
| 3,613,600 A * | 10/1971 | Pettit | | 104/91 |
| 4,365,618 A * | 12/1982 | Jones | | 126/576 |
| 4,509,501 A * | 4/1985 | Hunter | | 126/602 |
| 5,058,675 A * | 10/1991 | Travis | | 166/272.3 |
| 5,301,929 A * | 4/1994 | Pflanz et al. | | 266/252 |
| 5,787,878 A * | 8/1998 | Ratliff, Jr. | | 126/680 |
| 6,959,993 B2 * | 11/2005 | Gross et al. | | 359/853 |
| 7,380,549 B1 * | 6/2008 | Ratliff | | 126/605 |
| 7,677,466 B2 * | 3/2010 | Click et al. | | 238/151 |
| 8,162,495 B2 * | 4/2012 | Green | | 359/853 |
| 8,365,719 B2 * | 2/2013 | Caldwell | | 126/600 |
| 8,806,948 B2 * | 8/2014 | Kahn et al. | | 73/634 |
| 2007/0062195 A1 * | 3/2007 | Walpita | | 60/641.15 |
| 2009/0038608 A1 * | 2/2009 | Caldwell | | 126/600 |
| 2010/0182709 A1 * | 7/2010 | Ishida et al. | | 359/871 |
| 2010/0195227 A1 * | 8/2010 | Green | | 359/853 |
| 2011/0233292 A1 * | 9/2011 | Langenbeck | | 238/35 |
| 2012/0012101 A1 * | 1/2012 | Trujillo et al. | | 126/601 |
| 2012/0187276 A1 * | 7/2012 | Orsello | | 250/203.4 |
| 2012/0192857 A1 * | 8/2012 | Carlson et al. | | 126/573 |
| 2012/0260908 A1 * | 10/2012 | Orsello | | 126/643 |
| 2012/0325314 A1 * | 12/2012 | Cheung et al. | | 136/259 |
| 2014/0116419 A1 * | 5/2014 | Hernandez et al. | | 126/601 |

* cited by examiner

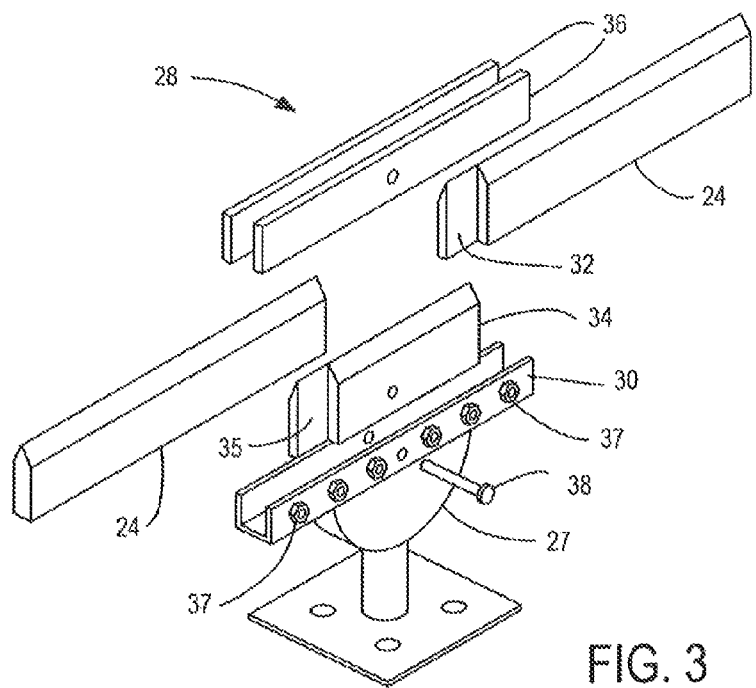
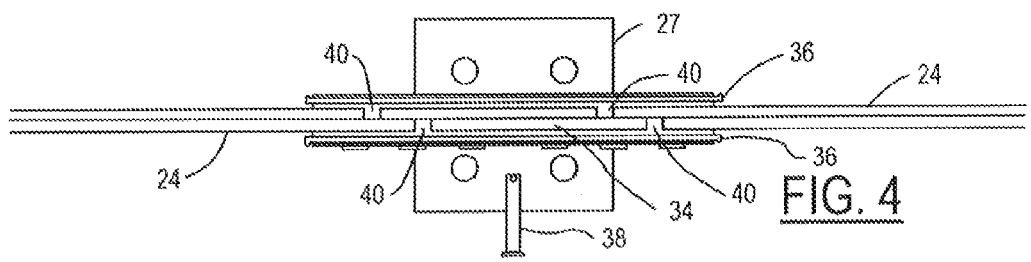
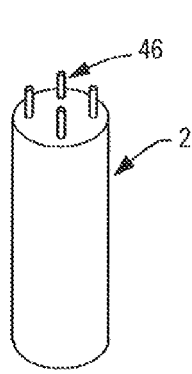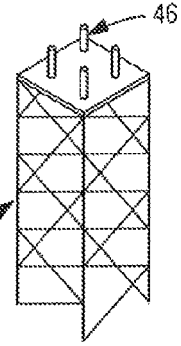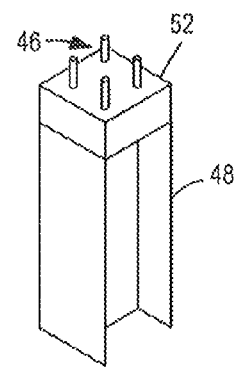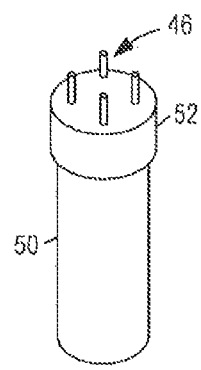
FIG. 5  FIG. 6  FIG. 7  FIG. 8

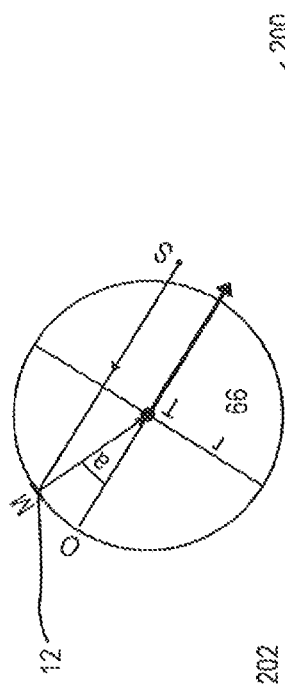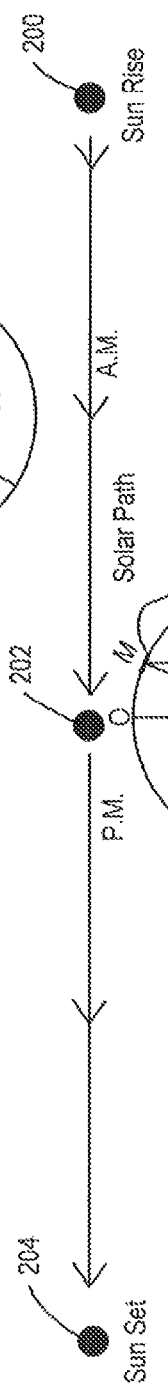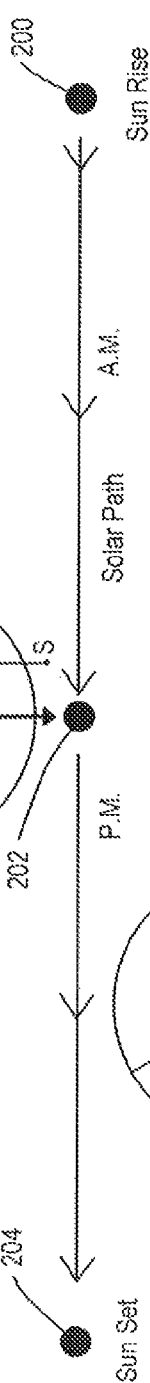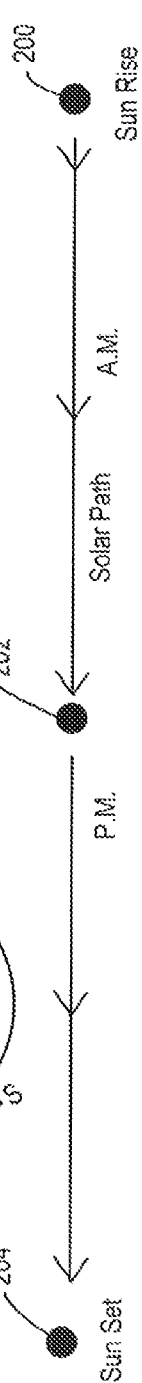
FIG. 13
FIG. 14
FIG. 15

METHOD AND SYSTEM FOR CONCENTRATION OF SOLAR THERMAL ENERGY

CROSS REFERENCE

This application claims the benefit of the filing date of PCT Application having international Serial No. PCT/US2010/051815, filed Oct. 7, 2010, entitled "System and Method for the Large Scale Gathering and Concentration of Solar Thermal Energy", which claims priority from U.S. Provisional Application Ser. No. 61/249,280, filed Oct. 7, 2009, entitled "System and Method for the Large Scale Gathering and Concentration of Solar Thermal Energy", the entire disclosures of which are hereby incorporated by reference into the present disclosure. This application is related to co-pending United States patent application Ser. No. PCT/US10/51817, filed Oct. 7. 2010, entitled "Method and System for Concentration of Solar Thermal Energy", the entire disclosure of Which is hereby incorporated by reference into the present disclosure.

TECHNICAL FIELD

The inventive subject matter relates to a solar thermal concentration system and more particularly to an arrangement and control of a heliostat array positioned about a centralized receiver in a solar thermal concentration system.

BACKGROUND

A current method for the large scale collection and concentration of solar energy is the use of heliostat mirrors to reflect the sun's rays to a central receiver. By utilizing multiple heliostat mirrors, each one reflecting to a common point, concentration of solar energy is achieved.

In known systems, heliostat mirrors may be in a fixed position surrounding the tower. The mirror surfaces are typically controlled in two degrees of motion to position the surface of the mirror with respect to the tower. Each heliostat mirror has a control system which tracks the motion of the sun with respect to the centrally located receiver. The mirror is on a fixed base and the reflective surface of the mirror is continuously moved to maintain the solar reflection from the surface of the mirror onto the receiver. The purpose of positioning the heliostat mirrors being to reflect and direct the sun's rays to a designated central collection point, known as a central target receiver or a power tower. In order to accomplish this, the heliostat mirror requires a surface area of reflective mirror, two axes of motion, a servo motor for each axis of motion and a control system for positional calculation and motion control of the two axes.

In some installations, the array of heliostats encompasses a full 360 degree area around a receiver. This is a very expensive installation due to the large number of heliostats required in order to populate the array and surround the receiver. Also, because the position of the sun is changing throughout the day, at any point in time more than half of the array has a very low performance due to their fixed placement within the array.

Other installations have attempted to address the issue of heliostat cost by reducing the number of mirrors. A reduced number of mirrors are controlled as a gang in that the heliostat array is a single movable unit that is positioned on a track. The array then rotates concentrically about the receiver on a horizontal plane of motion. The mirrors in the array are not only controlled as a single unit about the receiver, but are also movable as a single unit about a vertical axis to rotate their surface position with respect to the receiver. These installations are not practical for an installation having a large radius from the central tower. Also, large arc segments of mirrors will not target the receiver with adequate accuracy.

Furthermore, known concentric designs do not always take into account the requirement of a full 360° for rotation about the central receiver. In global implementations, particularly for solar tracking in latitudes between the Tropic of Cancer and the Tropic of Capricorn which comprises a large global market segment for solar thermal applications, known concentric designs may not capable of tracking the sun. For this special case, the solar path is not always southerly or northerly, but both depending on the day of the year. In fact, the solar path may be north or south of the central receiver and at one point, will be directly overhead. Without the capability of a full circle of motion for the array, known concentric designs will not operate within this equatorial band.

Another major factor in a solar thermal concentration system is the environmental impact of the installation. In known systems, a large area of land is necessary and that land must be dedicated to the sole purpose of solar thermal power collection. Additionally, the typical ground preparation for installation involves invasive grading and leveling practice which completely destroys the indigenous habitats and ecology of the terrain. Furthermore, the dedicated area is permanently covered by the mirror array, limiting ground exposure to natural heal and light provided by the sunlight, which negatively impacts the environment.

There is a need for a solar thermal concentration system and method that is cost effective to install and maintain, fully utilizes the collection possibilities as the earth orbits the sun, and has minimal adverse impact on the environment.

SUMMARY

A solar thermal concentration system having a receiver, a rail system having a plurality of concentric rails circularly disposed about the receiver, an array of heliostat mirrors arranged on the rail system and movable about the rail system. The array is configured to maximize mirror area based on the principle of cosine efficiency and a controller tracks the Sun and controls a position of the array with respect to the receiver and maintains the array opposite the sun.

A solar thermal concentration system having a receiver, a rail system having a plurality of concentric rails circularly disposed about the receiver, a plurality of movable carts connected adjacent one another and spanning two concentric rails of the rail system, motor means on a movable cart dispersed in the plurality of movable carts, at least one heliostat mirror on each of the plurality of movable carts, wherein the plurality of movable carts on the concentric rails defines an array of heliostat mirrors having a predetermined arc dimension configured to maximize mirror area based on a principle of cosine efficiency. A controller tracks the Sun and controls a position of the array with respect to the receiver and maintains the array opposite the Sun.

A method for collecting solar power is presented in which an array of heliostats is configured according to a principle of cosine efficiency in order to maximize an effective reflector area of each heliostat array in the array of heliostats and the array is moved about a circular system of concentric rails to maintain the heliostat array opposite the Sun.

DESCRIPTION OF DRAWINGS

FIG. 3 is an expanded view of an embodiment of a rail union bracket of the inventive subject matter;

FIG. 4 is a top view of the bracket of FIG. 3;

FIG. 5 is a perspective view of an embodiment of a pedestal;

FIG. 6 is a perspective view of another embodiment of a pedestal;

FIG. 7 is a perspective view of an embodiment of a piling pedestal;

FIG. 8 is a perspective view of another embodiment of a piling pedestal;

FIG. 13 is a circle diagram illustrating a clockwise rotation of the inventive subject matter at sun rise;

FIG. 14 is a circle diagram illustrating a clockwise rotation of the inventive subject matter at solar noon;

FIG. 15 is a circle diagram illustrating a clockwise rotation of the inventive subject matter at sun set;

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
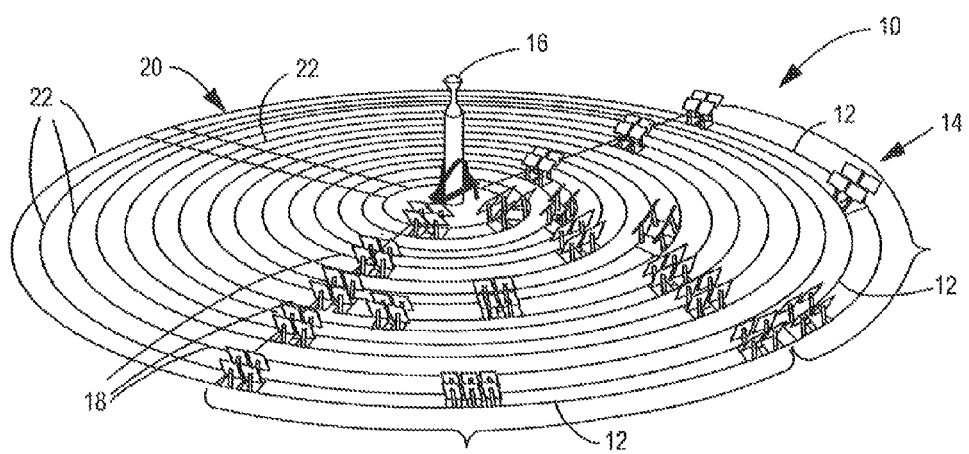
FIG. 1 is an overall view of a solar thermal concentration system of the inventive subject matter.

FIG. 1 is an overall view of a solar thermal concentration system 10 according to the inventive subject matter. A plurality of heliostat mirrors 12 forms an array 14 that is positioned around a centrally located receiver 16. The array 14 has a plurality of rows 18. Each row 18 of heliostat mirrors 12 in the heliostat array 14 is movable, horizontally, about the centrally located receiver 16. The heliostat array 14 is positioned upon a rail system 20. The rail system 20 is fixed to the ground as concentrically positioned rails 22 to form a circular pattern about the centrally located receiver 16. The number of rows 16 and rails 22 in the system 10 shown in FIG. 1 is for example purposes only. One skilled in the art is capable of determining the number of rows necessary for a particular installation depending on the power plant specifications.

Figure 2:
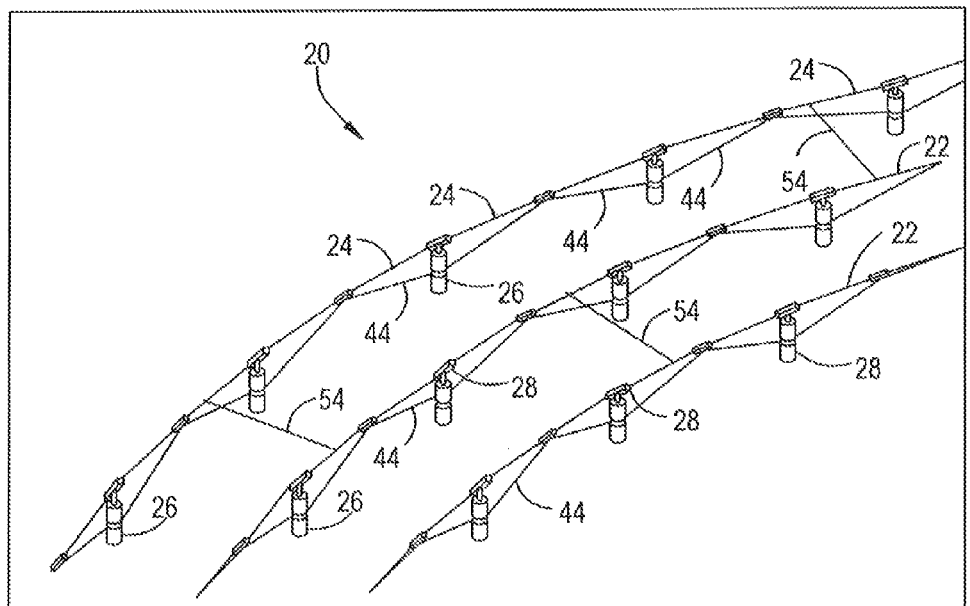
FIG. 2 is a perspective view of a section of supported raised rail system according to the inventive subject matter.

FIG. 2 is a section detail of the rail system 20 of the inventive subject matter. The rail system 20 of the inventive subject matter is a modular system in that each of the concentrically positioned rails 22 are defined by a plurality of rail sections 24 that are joined at a pedestal 26. In the example shown herein, a V-shaped configuration of the rail section 24 is detailed for example purposes only. It should be noted that the V-shaped rail sections 24 may be substituted with angle, I-beam, C-channel, or other configurations too numerous to mention herein. A rail union bracket 28 supports and joins two rail sections 24 at the pedestal 26. The rail sections 24 may have fixed length and arc dimensions making the sections modular for ease of installation. Each rail section is an integer segment of a concentric rail 22. The number of rail sections 24 will determine the diameter of each concentric rail 22. In an example embodiment the rail sections 24 have an arc length of 6π (18.8485°) and a radial pitch 18° maintaining a constant dimension that is easily assembled into a plurality of concentric rails 22 using any number of rail sections 24.

FIG. 3 is an expanded view of an embodiment of a rail union bracket 28 according to the inventive subject matter which joints two rail sections, end-to-end, supports the load of the rail sections 24 and accommodates thermal expansion and contraction of the rail sections 24. A channel section 30 is mounted to the pedestal 26 by a mounting bracket 27 and receives two rail sections 24. Each rail section 24 has a cut-away segment 32. A rail union joint 34 is positioned in the channel section 30 between each rail section 24 and overlaps with the cut-away segment 32 of each rail section 24. The rail union joint 34 has cut-away segments 35 at each end that abuts the cut-away segments 32 of the rail sections 24. A set of bushings 36 is positioned within the channel section 30, between the walls of the channel section 30 and the rail sections 24 and rail union joint 34. A connector, such as a union pin 38, or other suitable device, holds the channel section 30, bushings 36 and rail union joint 34 in place. The set of bushings 36 frictionally engage the rails 24 and the rail union joint 44 within the channel section 30. Set screws 37 may be implemented to adjust the tension of the bushings 36 against the channel section 30 and with the rail sections 24.

FIG. 4 is a top view of the rail sections 24 joined by a rail union bracket 28. Spaces 40 exist between the rail union joint 34 and the rail sections 24 to allow limited movement of the rail sections 24 and union joint 34 to accommodate possible expansion and contraction of the rails sections 24 and union joint 34. The bushings 36 also serve the purpose of aligning the rail sections 24 and the union joint 34 to maintain an even center line for the concentric rail 22.

Referring again to FIG. 2, rail support brackets 42 may be placed between pedestals 26 as needed to add further support to the rail system 20. Support struts 44 are connected at the rail support brackets 42 and at the pedestal 26. The rail support brackets 42 and struts 44 add stability to the rail system and increase a load that is to be supported by the rail system 20.

The rail system 20 may be affixed directly to the ground surface. However, in another embodiment of the present invention, as shown in FIG. 2, the rail system 20 is raised above the ground a predetermined distance in order to minimize disturbance of the land area. The pedestal 26 is positioned under the rail sections 24, secures the rail sections 24 and attaches to the ground in a manner that the environment is minimally encroached. FIG. 5 shows a possible configuration for pedestal 26. A concrete riser or sturdy cardboard tube filled with a material, such as concrete, having a bolt pattern 46 for attaching the rail union bracket 28 channel section 30 to the pedestal 26 is shown. FIG. 6 is yet another possible configuration which shows a lattice steel structure for the pedestal 26. One skilled in the art is capable of modifying the pedestal and rail cooperation in any manner of possible configurations without departing from the scope of the inventive subject matter.

In still another embodiment, the pedestal 26 is driven into the earth so that a section of the pedestal extends below the ground. In the embodiments shown in FIGS. 7 and 8, pilings are shown. In FIG. 7 an I-beam style piling 48 is shown and in FIG. 8 a cylindrical style piling 50 is shown. The piling styles shown are for example purposes only. One skilled in the art is capable of substituting the piling shape without departing from the scope of the inventive subject matter. In each piling configuration, a cap 52 having the bolt pattern 46 for attaching the rail union bracket 28 is attached to the piling.

Figure 9:
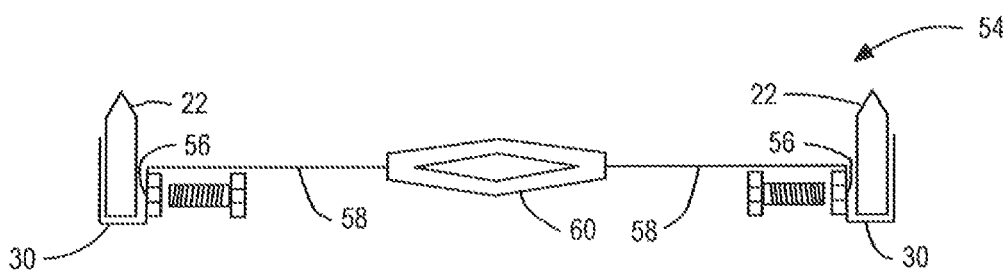
FIG. 9 is an end view of a radial spacer of the inventive subject matter.

Referring again to FIG. 2, in any given installation, the number and positioning of the pedestals 26 will vary and one skilled in the art is capable of making this determination. While minimal encroachment of the environment is one advantage of the raised rail system 20, other advantages may be realized such as ease of installation, maintenance and repair of the rail system and/or the heliostat array. The rail system 20 may also include radial spacers 54. Intra-rail radial spacers 54 maintain position and stability of concentric rails 22 of the rail system 20. Referring now to FIG. 9, an end view of an intra-rail radial spacer 54 is shown. A bracket 56 attaches a strut section 58 to each channel section 30. A single strut section 58 may be used, but in the embodiment shown in FIG. 9, a turn buckle 60 connects two strut sections 58 to provide radial spacing, yet accommodate any movement that may occur in the rail system 20.

Figure 10:
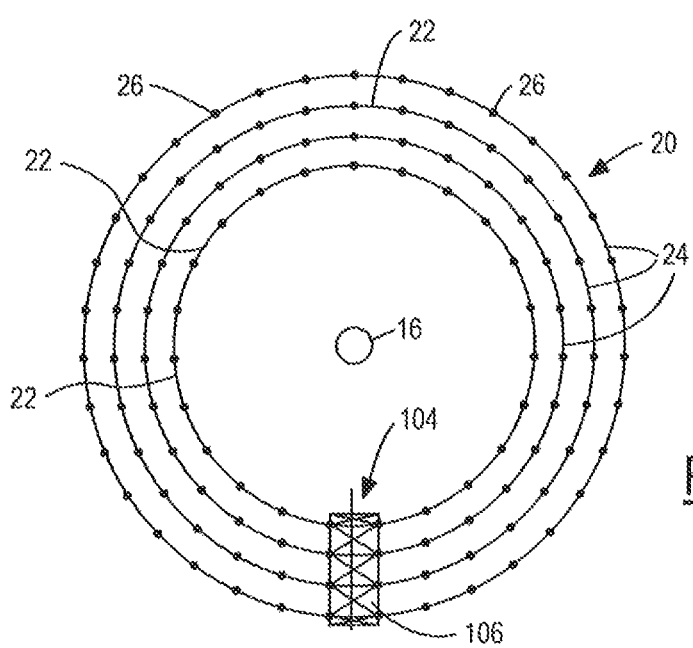
FIG. 10 is a top view of a single concentric rail and a single mirror of a solar thermal concentration system of the inventive subject matter.
Figure 11:
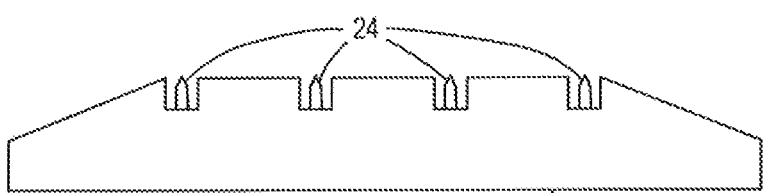
FIG. 11 is a side view of an access driveway according to the inventive subject matter.

Referring back to FIG. 1, the rail system 20 covers an area surrounding the receiver 16 and is a complete circle. FIG. 10 is a top view showing a plurality of concentric rails in a full 360° rail system 20. The full circle rail system 20 may have an access section 104 in which a driveway 106 is positioned between pedestals 26 and the rail sections 24 are inset in the driveway 106. This allows the heliostats to move over the full circle yet still provide an access point to the receiver 16. FIG. 11 is a side view of the driveway 106 with recessed rail sections 24.

Figure 12:
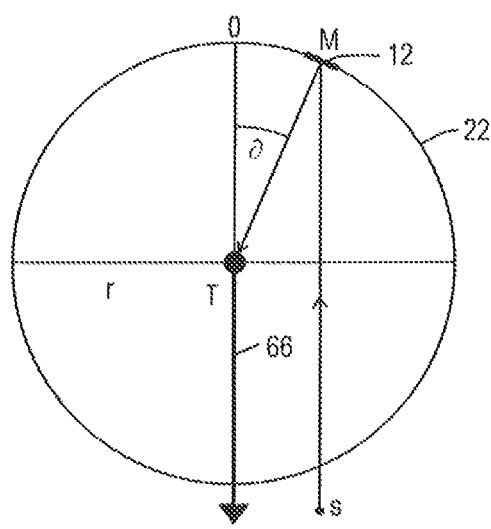
FIG. 12 is a circle diagram illustrating a single mirror and its clockwise rotation about a receiver with respect to the Sun.

The inventive subject matter provides a two dimensional model for solar tracking that will be described herein with reference to an overhead view of a single concentric rail 22 as shown in FIG. 12. A single concentric rail 22 is shown having an arbitrary radius, r, is centered at point, T. Assume that a single mirror, 12 is mounted at point, M on the rail 22. An angle, ∂ is defined to be [O, T, M], where O is designated as a zero angle, T is the center point, M is the position of the mirror, and a clockwise motion is positive rotation. An arrow 66 is pointing directly at the sun. A vector (S M) identifies one ray of solar radiation, or flux, and is parallel to all other rays of solar flux. In this configuration, the mirror point, M, may be permanently positioned to reflect the solar flux ray (S M) back to the target point, T, along the path (M T). When the mirror 12 rotates freely about the center point T, the mirror point M moves along the rail 22, about point T with a radius, r. A control system may be used to maintain the arrow 66 in a position that points directly at the sun. The angle, ∂, will remain constant and the mirror point, M, will always be positioned to reflect the solar flux ray (S M) back to the center point, T.

Referring now to FIGS. 13, 14 and 15, there are shown three positions of the rail 22 and mirror 12 as it rotates in a counterclockwise direction. In reality, the sun is tracked with and azimuth angle and solar elevation. In this two dimensional example, the solar elevation is always zero and the circle 64 is rotated towards the sun to keep the system relative to azimuth angle a constant 180 degrees. This rotation is illustrated in the three positions shown in FIGS. 13-15 which trace the clockwise rotation of the mirror 12 as it aligns to the position of the Sun beginning at the sun rise 200, FIG. 13, through solar noon 202, FIG. 14 and at sun set 204, FIG. 15. A single axis of tracking is necessary to align the mirror 12 toward the sun's position. According to the inventive subject matter, a plurality of mirrors 12 forming the array 14 are mounted to the rail system 20 and positioned to rotate the array 14 and mimic the movement as shown in FIGS. 13-15. For any number of mirrors, a single control motor may be required to simply rotate the array to track the sun's position.

Referring back to FIG. 1, the array 14 is comprised of a plurality of rows 18 having a plurality of heliostat mirrors 12 in each row. The array 14 takes up a section of the rail system that is less than the complete 360 degree circle of rail in the rail system 20. As mirror positions extend past quadrant points of the receiver, the angle of tilt for the mirror to reflect the sun to the receiver diminishes the effective area of the mirror, thereby reducing its effectiveness. This effect is referred to as cosine effect and is a function of the position of the mirror with respect to the Sun, the receiver 16 and a solar elevation angle.

Figure 16:
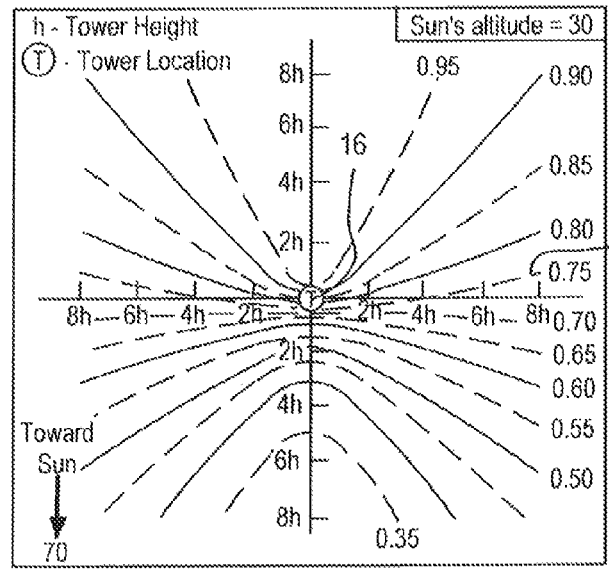
FIG. 16 is a graph depicting cosine efficiency.

In a preferred embodiment, the dimensions of the array 14 may be determined by applying the concept of cosine efficiency. The question to answer in determining the number of mirrors necessary is a question of cost versus collection gain. During solar noon, even mirrors that are positioned on the south side of receiver 16 have adequate performance due to the overhead angle of the Sun. The level of performance, however, falls sharply, when the sun is not in an optimal position, which is, unfortunately, most of the day. FIG. 16 is a graph showing a positional gradient of the cosine efficiency based on the location of a mirror 12 with respect to the receiver 16 and the Sun. The optimal spot for collection of solar flux rays is located in a semicircle, or boundary line 68, surrounding the central receiver 16 opposite the sun. The boundary line 68, based on cosine efficiency is preferably 75 percent. The shaded area represents the shape of the array 14.

Figure 17:
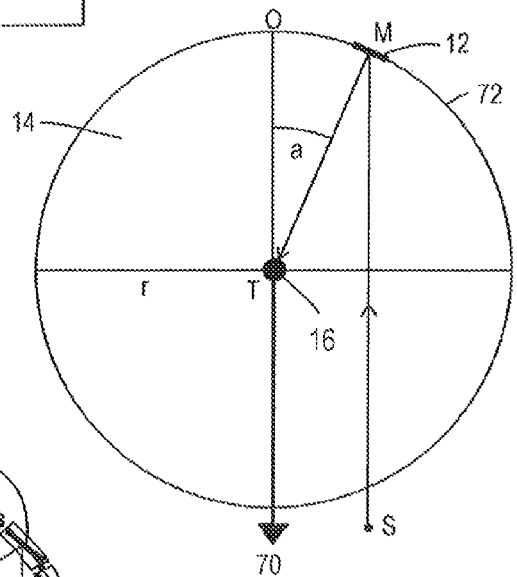
FIG. 17 is a graph illustrating an embodiment of an array in the solar thermal concentration system of the inventive subject matter.

According to the inventive subject matter, the array 14 moves concentrically about the receiver 16 so that it is always opposite of the sun 70. The system of the present invention provides a significant advantage over a fixed position heliostat in that it maximizes the cosine efficiency of the entire array 14 throughout the day. FIG. 17 is a depiction of an array shape according to one embodiment of the inventive subject matter in which the array 14 is a fan-shaped arc section of a circle that is approximately 160 degrees about the receiver 16. In this embodiment, cosine efficiency of the entire array 14 is maximized at approximately 75 percent.

Figure 18:
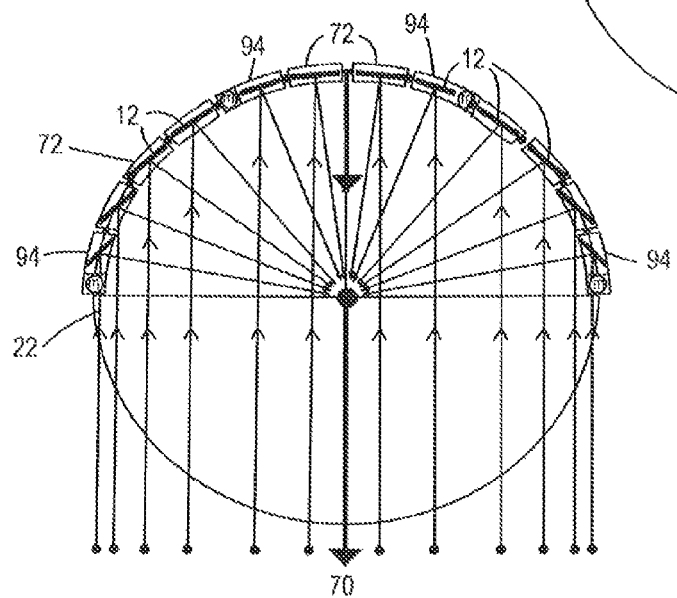
FIG. 18 is view of a cart train according to the inventive subject matter.

The array 14 is moved about the receiver 16 on the rail system 20 in order to always be opposite of the Sun. By using this tracking model, a more simplified heliostat control system may be implemented. According to this tracking, each heliostat 12 maintains a fixed position with respect to the solar azimuth and the receiver 16 throughout the solar day. Under this circumstance the heliostat mirror only has to compensate for the solar elevation angle. At least one heliostat mirror 12 may be positioned on a movable cart 72. Referring now to FIG. 18, a plurality of movable carts 72 may be positioned on each rail 22 in the rail system 20. It should be noted that the number and position of the carts shown in FIG. 18 is for example purposes only. While, for efficiency and cost considerations, less than a full 360 degrees of the array is manned with mirrors and carts, it is possible to achieve the benefit of a simplified heliostat design of the inventive subject matter using the entire circumference of the rail system 20. The number of carts 72 for each row may be determined by the position of the row from the location of the central receiver and the desired dimensions of the array using the concept of cosine efficiency. The carts 72 in each row are linked together, similar to train cars, with a motorized drive cart 94 at either end, or one or more motorized carts 94 interspersed in each row. The motorized carts 94 will be controlled to move the carts 72 back and forth along the rail 22. Each row of carts 72 is in communication with a controller (not shown) to control their movement and track the Sun, The row of carts 72 is movable into positions that maintain the orientation of the row of carts 72 in fixed configuration with respect to the solar azimuth.

Figure 19:
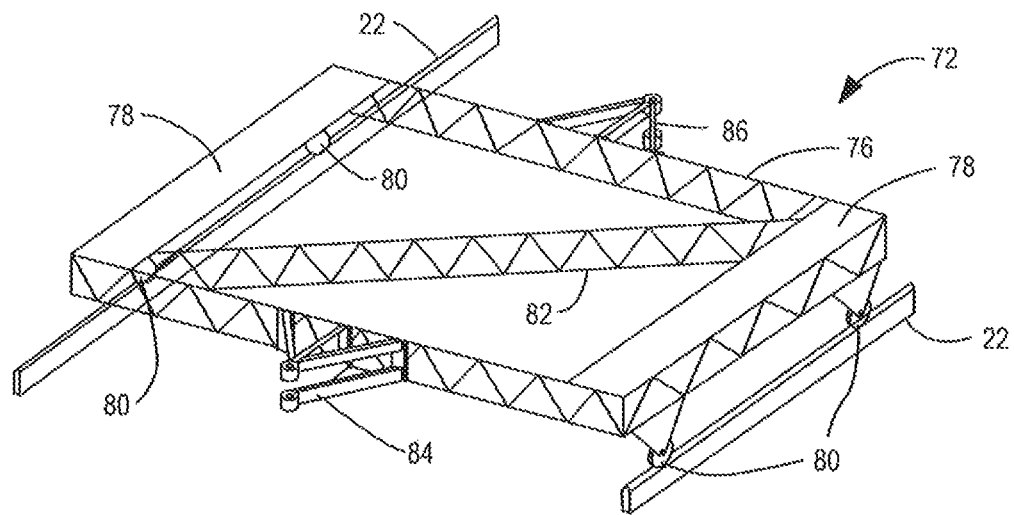
FIG. 19 is a perspective view of a cart according to the inventive subject matter.

FIG. 19 is a perspective view of a cart 72 on a rail 20. The cart 72 is mounted on the rail and, in concert with other attached carts 72, is moved along the rail as necessary for positioning the array 14 to track the sun based on the goal of maximizing cosine efficiency. The cart 72 may span two concentric rails 22 as shown in FIG. 19. A cart frame 76 has mounting surfaces 78 over each rail 22. Wheels 80 are provided on the cart frame 76 and in contact with the rail 22. One or more support struts 82 may be attached to the frame 76 for stability. The configuration of the support strut 82 shown in FIG. 19 is for example purposes only. One skilled in the art is capable of reconfiguring the position and attachment of the support struts without departing from the scope of the inventive subject matter.

Figure 20:
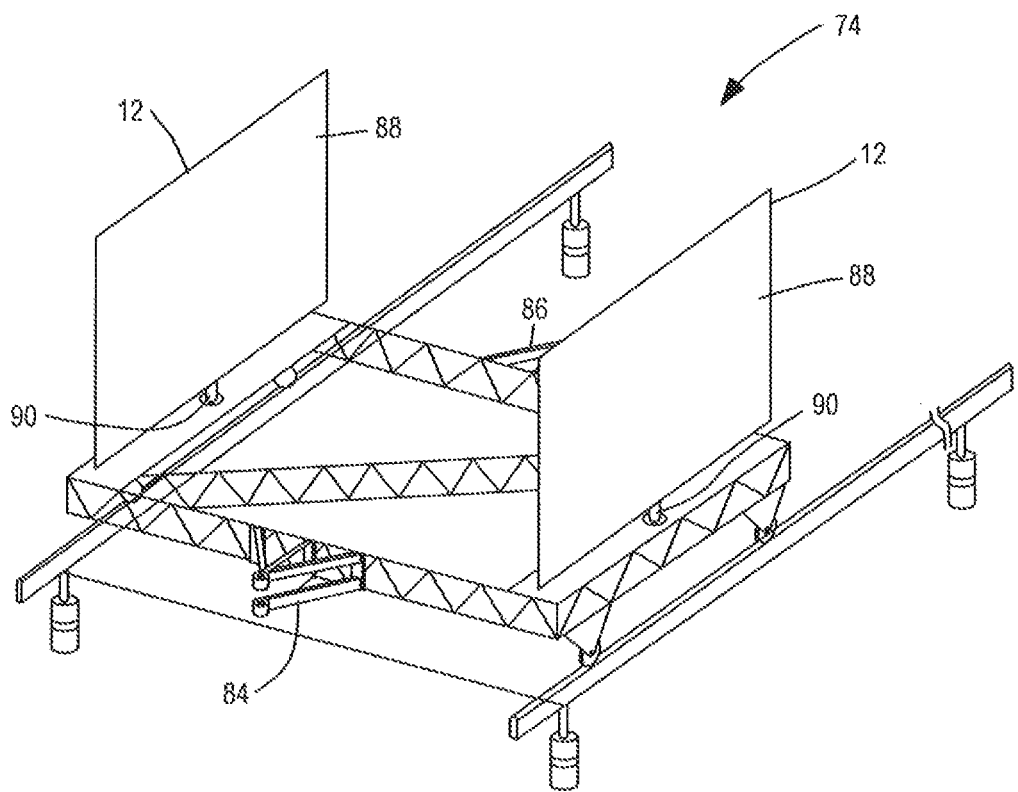
FIG. 20 is a perspective view of a mirror cart according to the inventive subject matter.

The cart frame 76 may support one or more heliostat mirrors 12 and comprises a mirror cart 74 as shown in FIG. 20. The cart frame 76 has connectors, female 84 and male 86 on two sides of the frame 76 between the mounting surfaces 78. The connectors allow any number of carts to be connected along the concentric rail. The heliostat 12 may be a traditional heliostat having two axes of adjustment. In the alternative, and because of the configuration and rotation of the heliostat array according to the inventive subject matter, the heliostat may have one servo-motor controlling a single axis or rotation.

Figure 21:
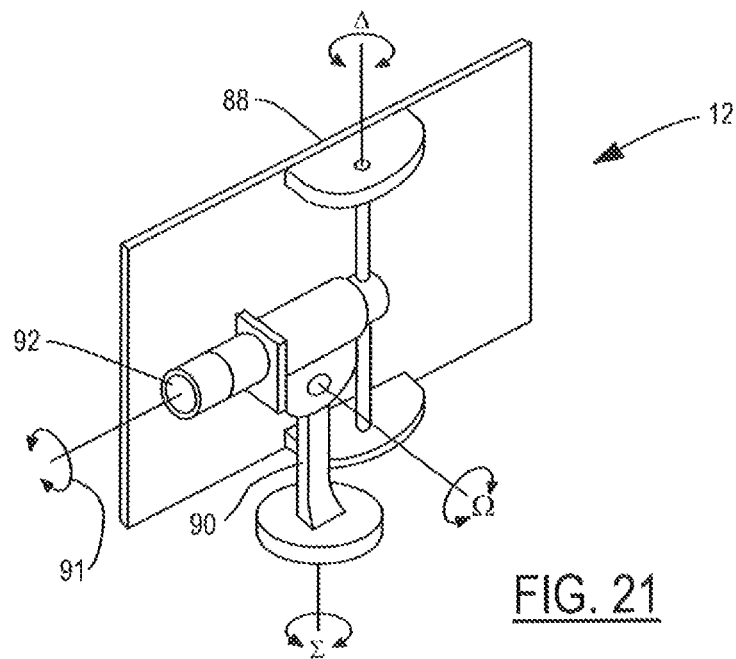
FIG. 21 is a perspective view of a heliostat element of the inventive subject matter.

Referring to FIG. 21, a heliostat 12 of the inventive subject matter is shown. The heliostat has a reflective element 88. The reflective element is mounted to the cart frame (not shown) at a mounting base 90. The reflective element 88 has one axis of rotation, 91 and three fixed adjustment, $\Delta$, E, and $\Omega$. The three fixed adjustments are each a function of the placement of the mirror cart 74 within each array row. Minor azimuth, E, declination of the axis, $\Omega$, and angular offset, $\Delta$ of the reflective element 88 are calculated using and computer model and adjusted upon installation with respect to the axis of rotation 91. These three fixed adjustments are a factor of the height of the central receiver and the cart location. A control servo motor 92 is attached to the single movable axis 91 of reflective element 88 and rotates the reflective element to track the sun and target its reflection to the receiver.

Figure 22:
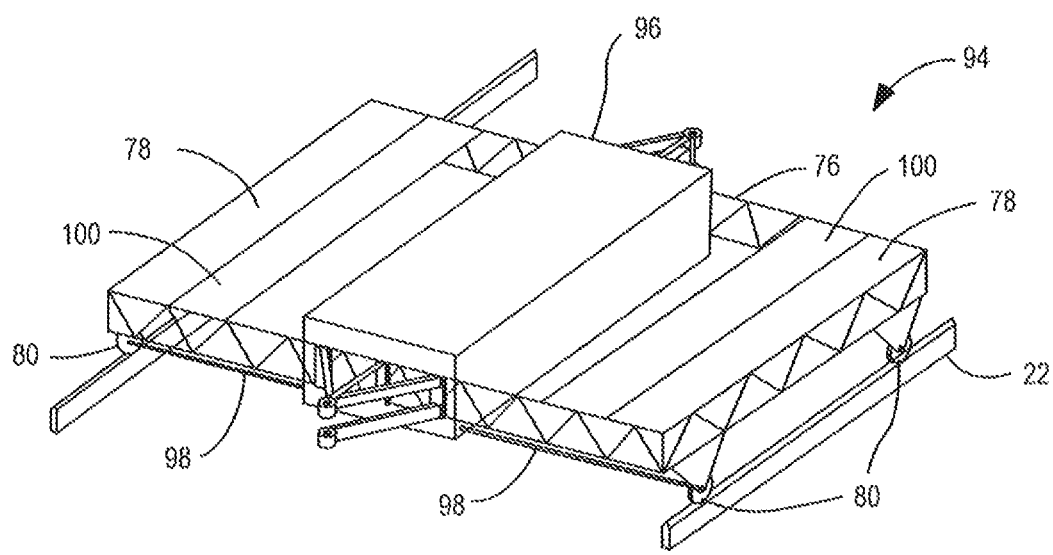
FIG. 22 is a perspective view of a motor cart according to the inventive subject matter.

A motorized cart 94 may be found at any point in a row of mirror carts. The motorized cart is shown in FIG. 22. A motor unit 96 is mounted on the cart frame 76. A wheel drive system 98 is connected between the motor unit 96 and each wheel or set of wheels on the cart frame 76. The carts 72, 94 span two concentric rails. The rpm of wheels 80 at the cart end on the rail 22 having a smaller diameter will be slightly slower than the rpm of wheels 80 at the cart end on the rail 22 having a larger diameter. Therefore, the motor unit 96 has two motors and two gear boxes so that each end of the cart frame 76 may be driven independently of the other. The motorized cart 94 may be equipped with one or more battery supplies 100 to charge the motor unit 96. To move a row of carts in a row of the array, a motorized cart 94 may be placed at either end of the row, or one or more motorized carts may be interspersed within the row of carts.

The movable array of heliostat mirrors based on the concept of cosine efficiency concentrates more solar thermal energy per area of reflectors. Because the array tracks the sun, solar thermal energy is being collected at its maximum efficiency throughout the solar day. Because the heliostats of the inventive subject matter only require a single axis of rotation, a significant cost savings is realized in the simplified design. The cost savings may be realized not only in the hardware of the heliostat, but also in a reduction in complexity of controlling the system as well as maintenance of the system. A higher thermal concentration is achieved by operating the array in an optimal position with respect to the sun and the central receiver. Higher operational temperatures will be realized thereby translating into higher efficiencies at the receiver.

The modular design of the rails sections of the present invention simplifies installation by reducing construction time and reducing the amount of labor involved in the installation. The modular rail sections allow for pre-fabrication of many components and ease of installation. The heliostat mirror carts are set in place on the rail system by the motorized carts, thereby positioning heliostat units quickly and easily. The inventive subject matter also lowers the service cost of operating and maintaining the system. Each row of carts may be independently rotated out of the array to allow access for service. Spare heliostat and/or carts may be provided as a replacement for a cart or mirror requiring service. A workable replacement in the field allows the system to continue to function while the damaged mirror and/or cart are serviced in a shop. Downtime is significantly reduced.

The raised rail design allows for installation above grade, thereby minimizing environmental impact and minimizing ground disturbance. According to the inventive subject matter, less than two percent of the ground is impacted. Furthermore, by moving the array of mirrors throughout the solar day, sun can penetrate to all areas of the ground at some point during the day. Also, minimal encroachment of the land eliminates the need to dedicate the land for the sole purpose of the solar array, which allows for mixed-use of the land area. According to the inventive subject matter, additional grounds of the site may be developed into recreational use areas such as picnic grounds.

The full 360° of concentric rails of the inventive subject matter allows for motion of the array about the central receiver in a clockwise direction for installations that are north of the Tropic of Cancer, counterclockwise for installations that are south of the Tropic of Capricorn, and a combination of either rotational direction for the latitudes that are within the equatorial band between the Tropic of Cancer and the Tropic of Capricorn.

In the foregoing specification, the invention has been described with reference to specific exemplary embodiments. Various modifications and changes may be made, however, without departing from the scope of the present invention as set forth in the claims The specification and figures are illustrative, rather than restrictive, and modifications are intended to be included within the scope of the present invention.

Accordingly, the scope of the invention should be determined by the claims and their legal equivalents rather than by merely the examples described.

For example, the steps recited in any method or process claims may be executed in any order and are not limited to the specific order presented in the claims. The components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A solar thermal concentration system comprising:
   a receiver;
   a rail system having a plurality of concentric rails circularly disposed about the receiver;
   an array of heliostat mirrors arranged on said rail system and movable on the rail system, the array being configured to maximize mirror area based on as principle of cosine efficiency; and
   a controller tracking the Sun, controlling a position of the array along as length of said rail system with respect to the receiver to maintain the array opposite the Sun and controlling rotational movement of each one of said heliostat mirrors about a respective single axis of rotation thereof, with respect to each other one of said heliostat mirrors, and dependent upon a solar elevation angle of the SUN.

2. The solar thermal concentration system as claimed in claim 1 wherein the array of heliostat mirrors further comprises at least one movable cart supported by at least one rail in the plurality of concentric rails, the at least one movable cart supporting at least one heliostat mirror in the array of heliostat mirrors.

3. The solar thermal concentration system as claimed in claim 2 further comprising:
   a plurality of movable carts connected adjacent one another and defining a train of movable carts; and
   motor means on a movable cart dispersed in the train of carts and in communication with the controller for moving the train with respect to the receiver and the Sun.

4. The solar thermal concentration system as claimed in claim 1 wherein the array of heliostat mirrors further comprises a plurality of rows and each row in the array of mirrors has a predetermined arc segment on each rail in the plurality of concentric rails.

5. The solar thermal concentration system as claimed in claim 4 wherein the predetermined arc segment is designed to maintain cosine efficiency at greater than 75 percent.

6. The solar thermal concentration system as claimed in claim 2 wherein the at least one movable cart spans two concentric rails in the plurality of concentric rails.

7. The solar thermal concentration system as claimed in claim 6 wherein the at least one movable cart spans two concentric rails and supports at least two heliostat mirrors, wherein a heliostat mirror is positioned over a concentric rail.

8. The solar thermal concentration system as claimed in claim 1 wherein each heliostat mirror in the array of heliostat mirrors has a single servo motor coupled to the controller for controlling rotation about the single axis of rotation of the heliostat mirror.

9. The solar thermal concentration system as claimed in claim 1 wherein the rail system further comprises a plurality of rail sections, each rail section having a predetermined arc dimension, wherein each concentric rail has a predetermined number of rail sections defining a circumference of the concentric rail.

10. The solar thermal concentration system as claimed in claim 9 wherein the rail system further comprises a rail union joint for joining two rail sections.

11. The solar thermal concentration system as claimed in claim 10 wherein the rail union joint further comprises means For accommodating expansion and contraction of the rail sections.

12. The solar thermal concentration system as claimed in claim 1 wherein the rail system further comprises a plurality of pedestal means positioned about each concentric rail to support and to maintain each of the concentric rails at a predetermined circumference.

13. The solar thermal concentration system as claimed in claim 11 wherein the plurality of pedestal means further comprises a pedestal height that maintains each concentric rail a predetermined distance above ground.

14. The solar thermal concentration system as claimed in claim 12 wherein the pedestal means is a piling having a section of the piling extending a predetermined distance above around thereby defining the pedestal height.

15. The solar thermal concentration system as claimed in claim 12 wherein the pedestal means further comprises a support for a rail union joint for joining two rail sections.

16. The solar thermal concentration system as claimed in claim 15 wherein the rail union joint further comprises means for accommodating expansion and contraction of the rail sections.

17. A solar thermal concentration system comprising:
   a receiver;
   a rail system having a plurality of concentric rails circularly disposed about the receiver;
   plurality of movable carts connected adjacent one another and spanning two concentric rails of the rail system;
   motor means on at least one movable cart dispersed in the plurality of movable carts;
   at least one heliostat mirror on each of the plurality of movable carts among the at least one movable cart having motor means, wherein the plurality of movable carts on the concentric rails defines an array of heliostat mirrors having a predetermined arc dimension configured to maximize mirror area based on at principle of cosine efficiency and wherein each one of said heliostat mirrors is constrained to rotational movement about a respective single axis of rotation thereof after the array has been configured to maximize said mirror area thereby allowing an orientation of each one of said heliostat mirrors with respect to each other one of said heliostat mirrors to be adjusted dependent upon a solar elevation angle of the SUN; and a controller for tracking the Sun, for controlling a position of the array along a length of said rails with respect to the receiver to maintain the array opposite the Sun and for controlling said rotational movement of each one of said heliostat mirrors about the respective single axis of rotation thereof dependent upon the solar elevation angle of the SUN;

wherein each heliostat mirror and each movable cart having motor means is in communication with the controller for moving the carts and heliostat mirror with respect to the receiver and the Sun.

18. The solar thermal concentration system as claimed in claim 17 wherein the array of heliostat mirrors further comprises a plurality of rows and each row of heliostat mirrors in the array of mirrors has a predetermined arc segment on each rail in the plurality of concentric rails.

19. The solar thermal concentration system as claimed in claim 18 wherein the predetermined arc segment is designed to maintain cosine efficiency at greater than 75 percent.

20. A method for collecting solar power comprising the steps of:

configuring an array of heliostats according a principle of cosine efficiency to maximize an effective reflector area of each heliostat in the array of heliostats, wherein each one of said heliostats is constrained to rotational movement about a respective single axis of rotation thereof after the array has been configured to maximize the effective reflector area of each one of said heliostats thereby allowing an orientation of each one of said heliostats with respect to each other one of said heliostats to be adjusted dependent upon a solar elevation angle of the SUN;

constraining rotational movement of each one of said heliostats to be about a respective single axis of rotation thereof after the array has been configured to maximize the effective reflector area of each one of said heliostats;

moving the array about a circular system of concentric rails to maintain the heliostat array opposite the Sun; and rotating of each one of said heliostat mirrors about the respective single axis of rotation thereof dependent upon the solar elevation angle of the SUN after the array has been configured to maximize the effective reflector area of each one of said heliostats.

* * * * *